July 10, 1951

J. J. KUPKA 2,560,295

PRESSURE FLUID ENGINE

Filed April 19, 1946

John J. Kupka
INVENTOR

BY Maurice Bloch
ATTORNEYS

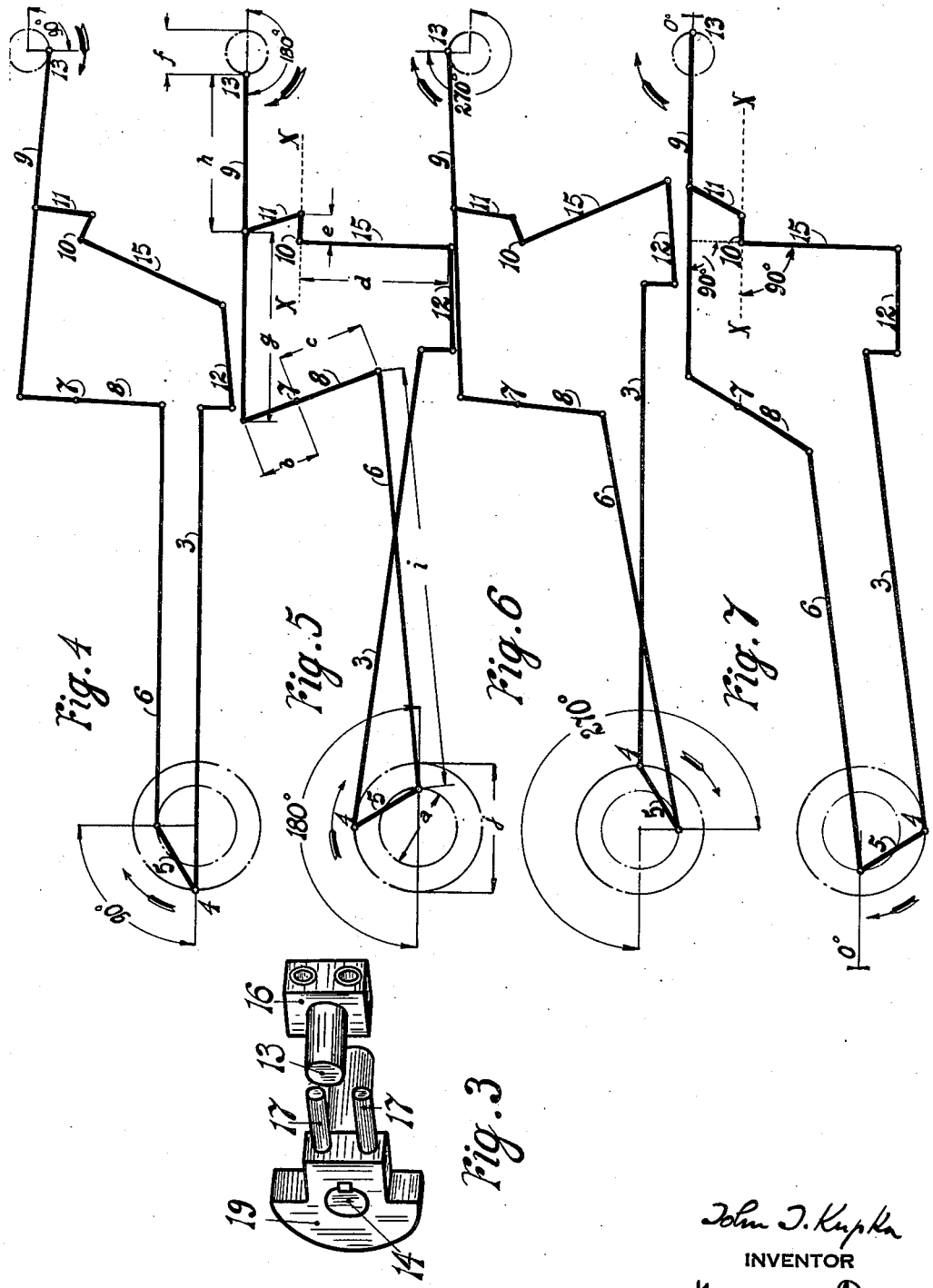

Patented July 10, 1951

2,560,295

UNITED STATES PATENT OFFICE 2,560,295

PRESSURE FLUID ENGINE

John J. Kupka, Gladstone, N. J., assignor to Jupiter Steam Appliances, Inc., New York, N. Y., a corporation of New York Application April 19, 1946, Serial No. 663,301

2 Claims. (Cl. 105—48)

This invention relates to an improved cam shaft driving mechanism for pressure fluid operated reciprocating engines of the marine or locomotive type. More particularly, it relates to locomotive steam engines, in which the distribution of steam is effected by means of poppet valves which are actuated by rotary cams.

Heretofore, it has been the customary practice in the selection of cam shaft drives for such engines, to employ a train of toothed gearing to transmit properly synchronized motion from the main crank shaft to the cam shaft which co-operatively engages with the individual poppet valves on the power cylinders. In the case of locomotive engines reference is made to known methods to effect such transmission of rotary motion from the crank shaft or driving axle of the locomotive to the cam shaft in the poppet valve gears of the Caprotti type or the "R. C." type, which are applied to a large number of locomotives. The necessity to make provision by means of splined shafts for changes in the length of the intermediary transmission shafts between the gear box associated with the driving axle of the locomotive and the cam box located on top of the power cylinders, which are the result of the inevitable relative movement of the driving axle within its guides in the main frames, leads very often to maintenance problems. Splined shafts in conjunction with universal joints require a different type of mechanic in the maintenance of such parts than is available in a good many instances in round houses or running sheds to which poppet valve equipped steam locomotives are assigned. This is especially true on overseas railways, where native mechanics are employed as a rule. Also the existence of toothed gearing in such cam shaft drives, which entail the use of ball or roller bearings with the attendant observance of close fitting tolerances and extremely delicate adjustment of gear centres to obtain proper tooth contact, lead very often to inconvenience in case of replacement of worn parts should properly skilled mechanics be unavailable. The customary practice in the maintenance of steam locomotives does not require the observance of very close fitting tolerances and as a rule relatively delicate maintenance operations such as are required on gear boxes and universal joints with splines and dynamically balanced transmission shaftings are sometimes a handicap in the more general use of poppet valve gears for steam locomotives.

In one known type of cam operated poppet valve gear of the rotary cam shaft type, the Cossart type, the transmission of power from the driving axle of the locomotive in synchronized movement to the cam shaft of the cam box is effected by a system of links and rods. Such a movement is disclosed in the German patent specification No. 479,494 and it depends essentially on the co-operative action of two eccentric arms at each side of the locomotive engine which are set at a relative angle of 90 with respect to each other. In order to compensate for any irregularities in the reproduction of the movement of the main pin of the driving axle on the cam shaft, a resilient member is interposed in the shape of a helical spring cushioned driving link which engages with the cam shaft crank on the Cossart system. The pre-loaded cushioned member frees the journal bearings of the train of movement transmission from any excessive shock loads which may occur in service. As the pre-loaded cushion member imposes by necessity larger pin loads, than are necessary, in order to prevent excessive overtravel of the driving link, all of the parts of this Cossart movement have to be made stronger than is necessary by cam shaft resistance considerations alone. In addition the continuous rotation of the cam shaft requires at all times the co-operative movements of both eccentric arms, one on each side of the locomotive, in addition to the necessity of having such cam shaft extending from one engine side to the other through the centre of the locomotive. This very often interferes with the normally constructed exhaust passages leading from the power cylinder to the base of the blast pipe. The object of this new invention is to provide more simplified and novel means for the transmission of synchronized rotary movement from the driving axle or main crank shaft of a pressure fluid operated reciprocating engine, preferably of the locomotive type, to a rotary shaft mounted on the power cylinder, which actuates the pressure fluid distributing means, such as poppet valves. Such novel means consist entirely of links and arms with associated pins, to the exclusion of toothed gearing, Cardan shaftings and universal joints.

Another object of this invention is to provide such means, constructed in a manner which will insure substantially a true reproduction of the angular crank shaft displacement on the cam shaft or cam driving mechanism shaft located in the vicinity of the power cylinder in a fixed relationship with the same, notwithstanding the relative movement within the frames of such an engine of the main driving axle or crank shaft, within the limits encountered in service. Such relative movement is mainly due to the unevenness of the road bed with the resulting action of the spring rigging in the case of a locomotive engine.

A further object of this invention is the provision of a cam shaft drive for a rotary cam mechanism, in which each power cylinder in the case of a two cylinder locomotive is provided with an individual drive mechanism to actuate the respective poppet valves, said mechanism being located at the outside of the locomotive engine frames and easily accessible for inspection and which employs only the type of mechanical elements, namely, links, pins and swinging arms, with which the locomotive-maintaining crews are familiar, by virtue of employing in such mechanism the same elements which are customary with the Walschaert or Baker type of valve gear.

Still another object of this invention is the provision of a mechanism to drive one rotating member from a driving rotating member by means of a system of links and rods, in which no dead centres prevail and which reproduces the angular movement of the driving rotary shaft substantially in unison in the driven rotating member small variations in the centre distance between the two rotating members notwithstanding.

In accordance with this invention these and other advantages which are incident to its application are secured by a preferred embodiment which is illustrated in the accompanying drawings.

In these drawings:

Fig. 3 is an isometric view of the compensator device embodied in the new invention and fully described in its function in the following specification.

Fig. 4 is a diagrammatic view showing the geometrical relationship of the component parts of this invention when the cross head of the contemplated power cylinder occupies the back dead centre position.

Fig. 5 is a diagrammatic view of the cam shaft drive corresponding to the main crank pin occupying its top position on a vertical centre line.

Fig. 6 is a diagrammatic view of the cam shaft drive in its position corresponding to the front dead centre location of the cross head of power cylinder.

Fig. 7 is a diagrammatic view of the cam shaft drive mechanism corresponding to the bottom location of the main crank pin on a vertical centre line.

Similar numerals indicate corresponding parts throughout the detailed illustrations.

Figure 1:
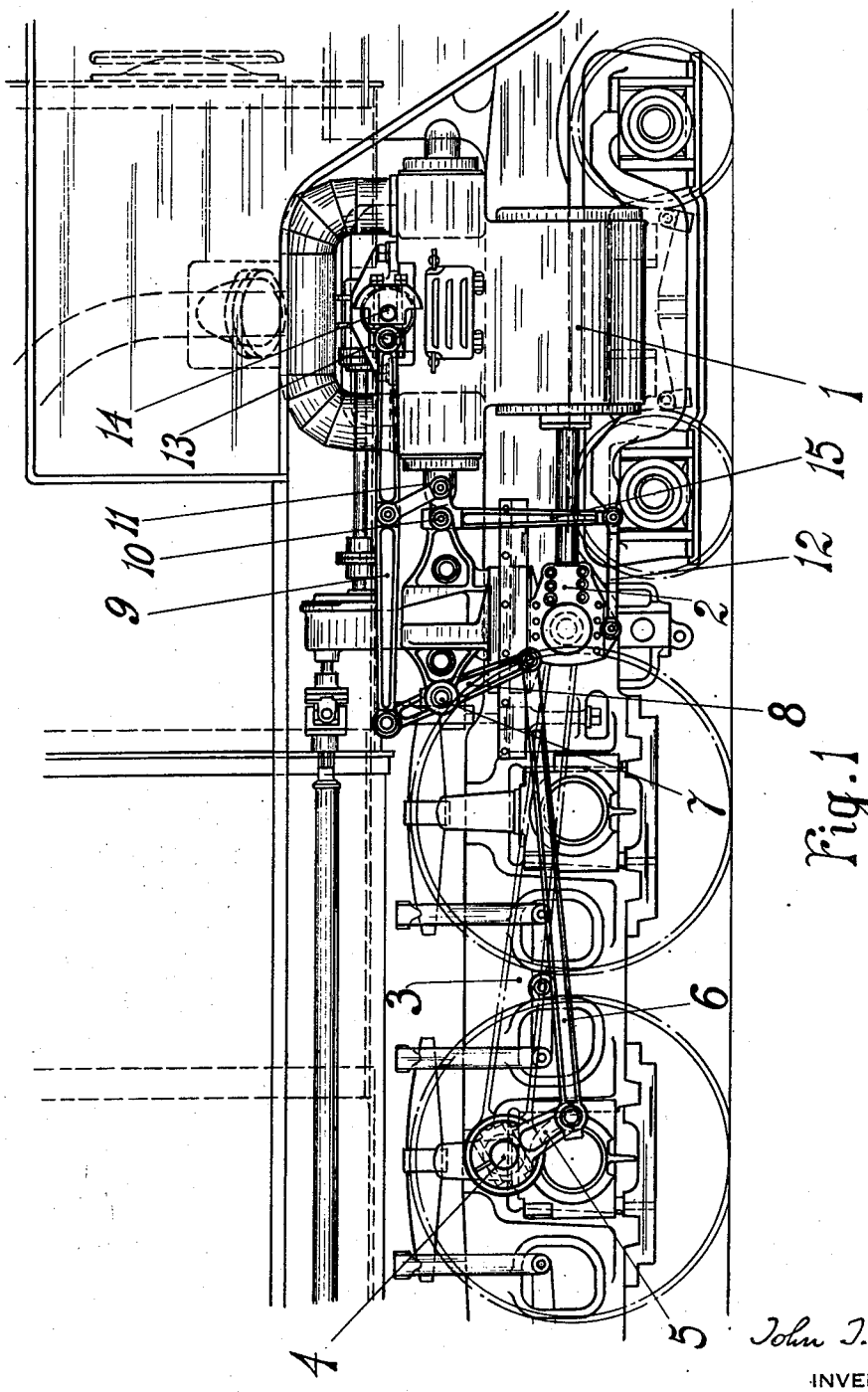
Fig. 1 is a side elevation of so much of a locomotive engine as is necessary to depict this invention in its relationship with said locomotive engine.
Figure 2:
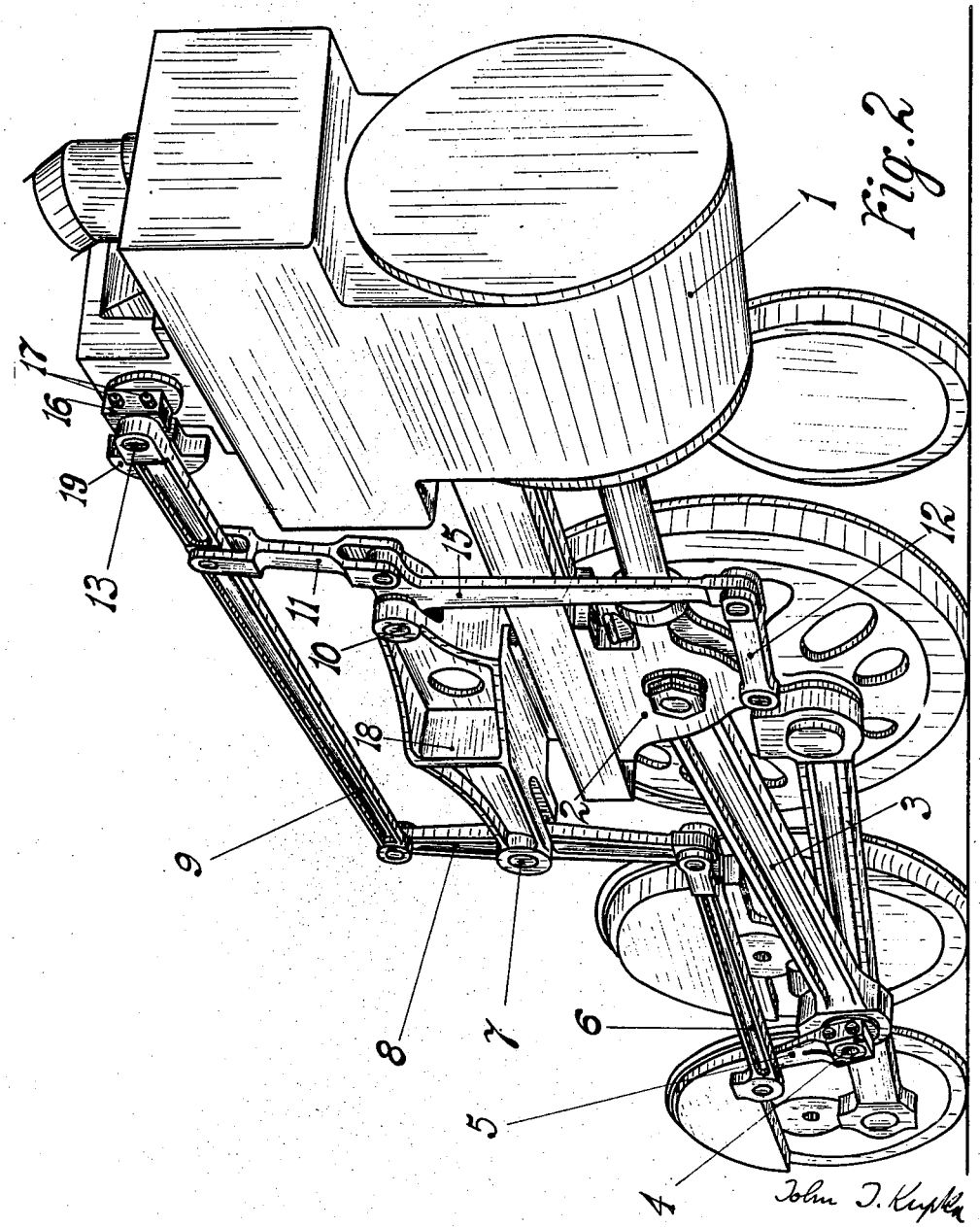
Fig. 2 is a perspective view of the said invention showing the assembly of the elements of the Fig. 1 in their relationship with the customary mechanism for transmission of power from the cylinders to the driving wheels on a steam locomotive engine of conventional character.

As will readily be seen from Fig. 1 and Fig. 2 the nature of the mechanism of the invention requires the minimum amount of special skill on the parts of the mechanics who maintain the customary type of valve gear of steam locomotives. From the point of accessibilty for inspection purposes, no change in routine is required. As in the case of the familiar Walschaert or Baker type of valve gear, the roundhouse mechanic is confronted with the same kind of machinery, namely pins, links, pin bushings and swinging arms and eccentric arm. Replacement of worn parts, such as pins and bushings can be made from spares carried in stock for the Walschaert or Baker type of valve gear, as it is possible with the new invention to so design its component parts, that interchangeability of bearings is possible. From the operating point, such a feature offers great advantages over the known types of poppet valve gears, since the number of spare parts to be kept in stock is greatly reduced. In the case of overseas railroad operation, where spare parts are not always readily available, simple machine parts, such as are most likely to wear out in the mechanism of the invention as depicted in the described illustrations, can be produced by the maintenance facilities in round houses and running sheds. Thus the availability of a poppet valve equipped locomotive will be increased, should it be necessary to carry out running repairs, without the need to carry stock spare parts. Incidental to the previously mentioned advantages there may also be stressed one other desirable feature. Whereas in the case of toothed gearing equipped cam shaft drive mechanism, with Cardan shafts, universal joints and splined shafts, it is necessary to provide special timing marks on the face of the gears in order to facilitate reassembly, when the cam shaft drive is to be dismantled for some reason or another, the mechanism shown in the accompanying illustrations is practically foolproof from the point of view of correct re-assembly. It can be re-assembled only in one way, the correct way. It is well to remember in this connection, that in the case of the customary types of rotary cam shaft drive mechanism, such as may be employed in the Caprotti or "R. C." type of valve gear, the locomotive must be spotted in a certain position, preferably in one of its dead centre positions, in order to check coincidence of the timing marks on the driving gears and driven gears. With a driving gear box located in the centre of the driving axle, this means very often a good deal of inconvenience, especially if the locomotive is not placed on a pit. The timing marks are very often covered with an accumulation of grease and dirt and proper checking takes some time and a good deal of inconvenience. In the case of the mechanism of the new invention, as will readily be appreciated from the illustrations, all this inconvenience is avoided, since there is only one way of reassembling the links and swinging arms and automatic synchronization, without any of the troublesome procedure in cam shaft drives of the known construction, is assured. This feature again should be considered as a most valuable advantage in cases of locomotive operation on overseas railways, where relatively unskilled native maintenance staff is the rule, rather than the exception.

By referring to Fig. 1, the power cylinder 1 is shown with its connection to its associated crosshead 2. The main rod 3 engages with main crank pin 4. Eccentric arm 5 which is securely attached to the main crank pin 4 lags behind in phase by 90 degrees or thereabouts. The eccentric rod 6 which is of the familiar type used on the Walschaert or Baker valve motion, co-operates with a double armed lever 8, which is fulcrumed on pin 7. The upper end of this said double armed lever 8 engages with rod 9 on one of its two ends. The other extreme end of rod 9 engages with pin 13 which is an integral part of the compensating member 16, as is shown more clearly by Fig. 2 and Fig. 3. This compensating member 16 slidingly engages with two parallel guide pins 17, which are secured to a counterweight 19, which in turn is attached to the cam shaft 14. It is to be understood however, that the cam shaft 14 may also be substituted by another rotating shaft which is co-operatively connected with the cams which actuate the poppet valves of the power cylinder 1. As is shown on Fig. 1 and Fig. 2, the rod 9 is also provided with another take-off point between its extreme ends, which is actuated by a secondary link 11. The swinging arm 15, which is fulcrumed on centre 10, receives its motion, which is in phase with main crank pin 4, through link 12 attached to the cross head 2. As is disclosed by Fig. 7, the upper extension of swinging arm 15, which engages with secondary link 11, is shown with a right angle location with respect to the lower extension which connects with link 12. As will be explained later on, this angular position is of extreme importance to the proper functioning of the new cam shaft drive mechanism, since it eliminates the effects of dead centres.

By referring again to Fig. 3, it should be noted, that the two parallel pins 17 make it possible for the geometric centre of pin 13 to move radially with respect to the axis of rotation of shaft 14, which in the preferred embodiment of the invention is the cam shaft proper of the poppet valve gear. This is of course a restricted radial movement, within limits of fractions of an inch from a given centre position and its purpose is solely the provision of compensation for irregularities in the train of movement transmission which may be due to excessive movement within the frames of the main driving axle of the locomotive. Were it not for such feedom of radial movement, rods 9 and eccentric rod 6 would be subjected to alternative tension and compression loads, which may be in excess of their mechanical strength. Such excessive loads are likely to occur each time the eccentric arm pin and the cam shaft drive pin 13 are in their dead centres. This can be best appreciated by consulting Fig. 5 and Fig. 7. Due to inevitable wear between the main driving boxes and the frame pedestal guides and the journals and driving axles, the actual centre distance measured in a horizontal direction between the driving axle and the cam shaft on top of the power cylinder tends to become variable. It becomes smaller when the main pin is moving on the upper half of the main pin circle for foreward motion of the locomotive engine, under the influence of the piston thrust. When the main crank pin travels in the lower half of the main pin circle, as is shown by Fig. 7 the piston thrust tends to increase the centre distance between the main driving axle and the cam shaft 14. It is quite obvious under such conditions, that an alternative stretching and buckling action in the power transmission train is bound to occur, unless a compensator is provided. The sliding block 16 gives the desired freedom for the pin 13 to find its own position, without materially affecting the trueness of reproduction of the rotary motion between the driving axle and main pin 4 and the rotary cam shaft 14. Without the creation of a secondary power impulse to overcome the dead centre effects, every time the double armed swinging lever 8 occupies one of its extreme positions, the cam shaft 14 would not be able to overcome its dead centre, if it is in the position shown on Fig. 1, Fig. 5 and Fig. 7. The function of the secondary link 11 in these dead centres is the creation of a properly directed thrust which acts substantially in a perpendicular direction with respect to the centre line of rod 9, so as to propel pin 13 in the absence of any thrust being transmitted from the double armed lever 8. When the cross head 2 is in one of its dead centre positions, as shown by Fig. 4 and Fig. 6 the cam shaft driving pin 13 occupies a position on a vertical line passing through its centre. The compensator 16 which carries pin 13 is then free to move radially in a vertical direction, to find again its own position, without subjecting the linkage to excessive compression or tension stresses, which would occur, if the pin 13 were rigidly connected with its cam shaft 14. A vertical displacement of the driving axles within the frames due to the spring action is not likely to affect noticeably the angular position of the cam shaft 14, since the versine effect due to the comparatively long main rod 3 and eccentric rod 6 will cause practically no supplementary movement of cross head 2 and the lower take-off point of the double armed lever 8. In order to obtain the most satisfactory conditions of transmission of the rotary movement of the main pin 3 to the cam shaft driving pin 13, the geometric relationship of the various component parts of the new invention should conform with certain rules. These are conveniently expressed by ratios of the lengths of the links and rods. By referring to Fig. 5 the following symbols are noted:

Stroke of the cross head 2: $j$
Throw of eccentric arm pin: $a$
Length of eccentric rod 6: $i$
Radial distance of lower pin centre of double arm 8 from its fulcrum 7: $c$
Radial distance of upper pin centre of double arm 8 from its fulcrum 7: $b$
Length of rod 9: $g+h$
Nominal throw of cam shaft driving pin circle: $f$
Length of long end of swinging arm 15: $d$
Length of short end of swinging arm 15: $e$ The following ratios should govern the selection of the lengths of the various parts of the new invention:

(1) $$\frac{a}{f}=\frac{c}{b}$$

(2) $$\frac{i}{g+h}=\frac{c}{b}$$

(3) $$\frac{f}{j}=\frac{e(g+h)}{d\times g}$$

In addition to the foregoing it is essential to arrange for substantial parallelism between the rod 9 and the short end extension of the swinging arm 15 when the main pin 4 occupies its top or bottom position as is indicated by Fig. 5 and Fig. 7. Line X—X which coincides with the centre line of the short end extension of swinging arm 15 is clearly shown to be substantially parallel with rod 9, which in Fig. 7 is also substantially perpendicular with respect to the centre line of the long end extension of the swinging arm 15 for the main pin positions shown.

It should be noted however, that the perpendicular relationship of line X—X and the long end extension of swinging arm 15 is only to be observed, when there is right angle intersection between the two extensions of said swinging arm 15. Should it be found necessary to make the angle of intersection of these two extensions of swinging arm 15 other than 90 degrees, the location of the fulcrum centre 7 must be arranged to ensure parallelism between the centre line of rod 9 corresponding to main pin positions of Fig. 5 and Fig. 7 and the line X—X which coincides with the centre line of the short end extension of the swinging arm 15, prevailing for these two main pin positions. Finally, it is also possible with this new invention to arrange for permanent alignment of the fulcrums for levers 8 and 15 by incorporation of same within the cross head guide support 18 as is shown by Fig. 2.

While the above description and illustrations submitted refer to a specific application of the new invention to a locomotive type of steam engine, it will be understood by those skilled in the art, that the specific details of construction may also be applied to marine engines, employing cam shafts of the rotary type or to any other type of engine or mechanism, where it is found desirable and advantageous to transmit a rotary motion in a substantially synchronous manner from one driving member to a driven member, without the use of toothed gearing, Cardan shafting and splines, small variations in the distance between the centres of the two rotating members notwithstanding.

Having now described my invention, what I claim and desire to protect by Letters Patent is:

1. In a reciprocating pressure fluid driven locomotive engine, a power cylinder, a cross head associated therewith, mechanism for transmission of power from said power cylinder to the driving wheels of such engine, a crank pin associated with a driving wheel of such engine, pressure fluid distributing means associated with said power cylinder, a rotary shaft co-operating with the pressure fluid distributing means aforesaid, a driving member for actuating said rotary shaft which is free to move substantially in a radial direction with respect to the axis of rotation of the aforesaid rotary shaft, a connecting rod provided with three journal bearings or pins, one of which being in engagement with the radially moveable driving member aforesaid, a swinging lever connecting with another journal bearing or pin of the aforesaid connecting rod at one part and actuated at another part thereof by an eccentric arm set at an angle of 90 degrees or thereabouts with respect to its associated crank pin which co-operates with the power transmitting mechanism between the power cylinder and the driving wheels, a secondary swinging arm engaging by means of a link with the remaining journal bearing or pin of the aforesaid connecting rod and driven from the cross head associated with the aforesaid power cylinder and fulcrums for said swinging lever and secondary swinging arm which are in a selectively predetermined and fixed relationship with respect to the engine bed of such locomotive engine.

2. In pressure fluid driven locomotive engine or the like, a pressure fluid distributing system, a rotary member therein to effect the timing of the valve events, in combination with mechanism for transmission of power from the power cylinders to the driving wheels or crank shafting mechanism to actuate the said rotary member, comprising an associated connecting rod, a cross head actuated swinging bell crank, a swinging arm actuated by an eccentric arm set at a right angle or thereabouts with respect to the main pin or the crank pin associated with aforesaid crosshead, a link connection between a part of the said swinging bell crank and the said connecting rod at a point selectively located with respect to the junctions on said connecting rod established for the rotary member of the pressure fluid distribution system and the eccentric arm actuated swinging arm, geometric correlation of proportions and fulcrum positions of the aforesaid swinging arm and bell crank with respect to cross head travel and eccentric arm pin circle diameter to ensure substantially right angle intersection of the directions of the actuating impulses for the rotary member in the pressure fluid distribution system in the four quarterly angular positions, a sliding means associated with the aforesaid connecting rod and the aforesaid rotary member which permits radial displacement with respect to the axis of rotation of the latter.

JOHN J. KUPKA.

REFERENCES CITED

The following references are of record in the file of this patent:

UNITED STATES PATENTS

| Number | Name | Date |
| --- | --- | --- |
| 65,051 | Bloomsburg et al. | May 28, 1867 |